US010822264B2

(12) United States Patent
Takiguchi et al.

(10) Patent No.: US 10,822,264 B2
(45) Date of Patent: Nov. 3, 2020

(54) ALKALI-FREE GLASS SUBSTRATE AND METHOD FOR MANUFACTURING ALKALI-FREE GLASS SUBSTRATE

(71) Applicant: AGC INC., Tokyo (JP)

(72) Inventors: Tetsushi Takiguchi, Tokyo (JP); Shunji Inoue, Tokyo (JP); Kazutaka Ono, Tokyo (JP); Hirofumi Tokunaga, Tokyo (JP); Jun Akiyama, Tokyo (JP); Yasumasa Kato, Tokyo (JP); Taketoshi Taniguchi, Tokyo (JP)

(73) Assignee: AGC INC., Tokyo (JP)

( * ) Notice: Subject to any disclaimer, the term of this patent is extended or adjusted under 35 U.S.C. 154(b) by 587 days.

(21) Appl. No.: 15/458,519

(22) Filed: Mar. 14, 2017

(65) Prior Publication Data

US 2017/0267572 A1 Sep. 21, 2017

(30) Foreign Application Priority Data

Mar. 15, 2016 (JP) .................................. 2016-051002

(51) Int. Cl.
| B32B 9/00 | (2006.01) |
| C03C 3/091 | (2006.01) |
| C03B 17/06 | (2006.01) |
| C03B 25/08 | (2006.01) |
| C03B 18/02 | (2006.01) |

(52) U.S. Cl.
CPC .............. *C03C 3/091* (2013.01); *C03B 17/06* (2013.01); *C03B 25/08* (2013.01); *C03B 18/02* (2013.01); *Y02P 40/57* (2015.11); *Y10T 428/30* (2015.01)

(58) Field of Classification Search
CPC .............................. C01B 31/04; Y10T 428/30
USPC ........................................................... 428/408
See application file for complete search history.

(56) References Cited

U.S. PATENT DOCUMENTS

| 7,833,919 B2 | 11/2010 | Danielson et al. |
| 2007/0191207 A1 | 8/2007 | Danielson et al. |
| 2009/0321005 A1* | 12/2009 | Higuchi ................ B32B 27/283 156/249 |
| 2014/0038807 A1* | 2/2014 | Tsujimura ............... C03C 3/091 501/66 |

(Continued)

FOREIGN PATENT DOCUMENTS

| CN | 101370742 A | 2/2009 |
| JP | 2008-184335 A | 8/2008 |

(Continued)

*Primary Examiner* — Daniel H Miller
(74) *Attorney, Agent, or Firm* — Foley & Lardner LLP

(57) ABSTRACT

The present invention relates to an alkali-free glass substrate, in which when two arbitrary sites in one main surface thereof are selected, an absolute value of a difference between a thermal shrinkage ratio in an arbitrary direction at one site and a thermal shrinkage ratio in a direction orthogonal to the arbitrary direction at another site is 2 ppm or less, provided that the thermal shrinkage ratio is calculated by measuring a deformation amount in a measuring direction of the glass substrate between before and after a heat treatment of raising a temperature from normal temperature to 600° C. at 100° C./hour, holding the glass substrate at 600° C. for 80 minutes, and lowering the temperature from 600° C. to normal temperature at 100° C./hour.

13 Claims, 2 Drawing Sheets

(56) References Cited

U.S. PATENT DOCUMENTS

2015/0087495 A1* 3/2015 Nishizawa .............. C03C 3/093
501/67

FOREIGN PATENT DOCUMENTS

| JP | 2009-525942 A | 7/2009 |
| JP | 2016-029001 A | 3/2016 |

* cited by examiner

ALKALI-FREE GLASS SUBSTRATE AND METHOD FOR MANUFACTURING ALKALI-FREE GLASS SUBSTRATE

FIELD OF THE INVENTION

The present invention relates to an alkali-free glass substrate suited to a high-definition display application for a mobile device, and a method for manufacturing the alkali-free glass substrate.

BACKGROUND OF THE INVENTION

As a pixel control transistor for a liquid crystal display, a thin film transistor (TFT) of an amorphous silicon (a-Si) type is used, but among others, as the high-definition display application for a mobile device including an organic EL display, a transistor of a polycrystalline silicon (p-Si) type is being used. In the case of an a-Si transistor, the maximum in-process temperature in the TFT array fabrication process is about 350° C., but in the case of a p-Si transistor, the maximum in-process temperature in the TFT array fabrication process may reach even 600° C. (for example. Patent Document 1).

For the liquid crystal display application, an alkali-free glass substrate having a small absolute value of the thermal shrinkage ratio in the TFT array fabrication process is required, and recently, in addition to the absolute value of the thermal shrinkage ratio, it also becomes important to cause a small variation in the thermal shrinkage ratio between substrates or in a surface. The reason therefor is, for example, that even when the absolute value of the thermal shrinkage ratio is small, if a large variation of thermal shrinkage ratio is produced between substrates or in a surface, the line width of black matrix (BM) must be increased and in turn, the opening ratio cannot be increased.

The glass substrate described in Patent Document 2 is an alkali-free glass substrate for use in an a-Si transistor and has a small variation of thermal shrinkage ratio within the substrate and when correction by a photomask is performed at the time of formation of a TFT circuit, since thermal shrinkage within the substrate is always in a given range, pattern formation can be stably performed with good yield.

In Patent Document 2, it is stated that "The sheet glass cooled at a high cooling rate has a large thermal shrinkage ratio, whereas the sheet glass cooled at a low rate has a small thermal shrinkage ratio. In addition, since the glass substrate is continuously drawn by a glass forming apparatus, the temperature history (cooling rate) fluctuates little in the sheet drawing direction. In turn, a difference in thermal shrinkage ratio is less likely to be produced in the sheet drawing direction, but a temperature difference is readily produced in the sheet width direction, and the temperature history (cooling rate) differs particularly between the central portion and the end part. As a result, the difference of thermal shrinkage ratio in the sheet width direction is large." The variation of thermal shrinkage ratio within the substrate is therefore supposed to be suppressed by equalizing the average cooling rate in the sheet width direction of a glass ribbon.

Patent Document 1: JP-T-2009-525942
Patent Document 2: JP-A-2008-184335

SUMMARY OF THE INVENTION

However, according to the studies of the present inventors, it was found that, in the annealing step of the manufacturing method of an alkali-free glass substrate for use in a p-Si transistor, even when the average cooling rate in the sheet width direction of a glass ribbon is equalized, a variation is sometimes produced in the thermal shrinkage ratio within the substrate. For example, when one arbitrary site within the substrate is selected and the difference in thermal shrinkage ratio between two orthogonal directions (e.g., the sheet drawing direction and the sheet width direction) is evaluated, a difference is sometimes produced in the thermal shrinkage ratio. This illustrates the possibility that the thermal shrinkage behavior may differ between two orthogonal directions. Incidentally, Patent Document 2 is silent on the difference of thermal shrinkage ratio in the sheet drawing direction.

In addition, when two arbitrary sites within the substrate are selected and it is assumed that the thermal shrinkage ratio in an arbitrary direction at one site A is $C_A$ and the thermal shrinkage ratio in a direction orthogonal to the arbitrary direction described above at another site B is $C_B$, the absolute value $|C_A-C_B|$ of the difference between thermal shrinkage ratio $C_A$ and thermal shrinkage ratio $C_B$ cannot be reduced only by equalizing the cooling rate to make the fictive temperature within the substrate uniform. Here, the absolute value $|C_A-C_B|$ of the difference in the thermal shrinkage ratio is defined as "anisotropic variation". One site A and another site B may be the same site within the substrate.

The present inventors thought that the cause of the anisotropic variation does not arise only from a so-called structural relaxation phenomenon, and studied on the mechanism for the generation thereof. As a result, it has been found that in the deformation of glass within a short time, a structural relaxation phenomenon does not occur by itself but is accompanied by a "delayed elastic phenomenon" not accompanying a change in the fictive temperature of glass, and this greatly participates in the generation of variation.

The reason why thermal shrinkage attributable to delayed elasticity occurs is described below. In a fusion process and a float process, which are a typical mass-production process of a glass substrate, a formed glass ribbon is annealed while pulling it and therefore, the process includes a step of annealing a glass ribbon in the state of a stress being generated in the sheet drawing direction. Furthermore, the linear expansion coefficient of the glass ribbon is significantly changed due to a temperature change in the vicinity of the glass transition point Tg, and a spatial non-uniform heat shrinkage occurs in the temperature region across the glass transition point Tg in the annealing step, as a result, a stress distribution is produced in the sheet width direction. Here, in the case where a glass ribbon is cooled to room temperature in the state of a stress being applied to the heated glass ribbon and the glass ribbon is thereafter cut to release the load, the elastic deformation amount of the obtained glass substrate is not completely 0, and a small amount of deformation remains. This is referred to as delayed elasticity. Restoration from the deformation remaining as delayed elasticity gradually proceeds as a relaxation phenomenon having a predetermined time constant when the glass substrate is re-heated in the TFT array process, and the deformation amount finally reaches 0. It has become evident that this "return phenomenon at the time of re-heating" gives rise to occurrence of the anisotropic variation of thermal shrinkage within the substrate.

In order to solve the problems of those conventional techniques, an object of the present invention is to provide an alkali-free glass substrate capable of reducing the variation of thermal shrinkage ratio in the TFT array fabrication process when used in a high-definition display application for a mobile device, and a method for manufacturing the alkali-free glass substrate.

The present invention has been accomplished based on the above-described finding and provides an alkali-free glass substrate, in which when two arbitrary sites in one main surface thereof are selected, an absolute value of a difference between a thermal shrinkage ratio in an arbitrary direction at one site and a thermal shrinkage ratio in a direction orthogonal to the arbitrary direction at another site is 2 ppm or less. The thermal shrinkage ratio is calculated by measuring a deformation amount in a measuring direction of the glass substrate between before and after a heat treatment of raising a temperature from normal temperature to 600° C. at 100° C./hour, holding the glass substrate at 600° C. for 80 minutes, and lowering the temperature from 600° C. to normal temperature at 100° C./hour.

The present invention also provides a method for manufacturing an alkali-free glass substrate, the method including: a melting step of melting a glass raw material in a glass melting furnace to obtain a molten glass; a forming step of forming the molten glass into a glass ribbon in a forming furnace; and an annealing step of annealing the glass ribbon in an annealing furnace to obtain a sheet glass, in which, in the annealing step, a cooling rate of the glass ribbon when a logarithm of a viscosity (dPa·s) of the glass ribbon is from 12.5 to 14.0 is larger in an end part than in a central part in a sheet width direction, a cooling rate difference in a sheet drawing direction between the central part and the end part in the sheet width direction of the glass ribbon is 100° C./min or less, a temperature difference between the central part and the end part in the sheet width direction of the glass ribbon is 15° C. or less, when a temperature of the glass ribbon is higher in the end part than in the central part in the sheet width direction, the cooling rate difference is 70° C./min or less at the temperature difference of 10° C. or less and the cooling rate difference is 40° C./min or less at the temperature difference of more than 10° C., and when the temperature of the glass ribbon is lower in the end part than in the central part in the sheet width direction or equal between these parts, the cooling rate difference is 100° C./min or less.

The alkali-free glass substrate and the method for manufacturing an alkali-free glass substrate of the present invention ensure that when used in a high-definition display application for a mobile device, the variation of thermal shrinkage ratio in the TFT array fabrication process can be reduced and since the line width of BM need not be increased, the opening ratio can be increased, and are therefore suited to high-definition display application for a mobile device.

DETAILED DESCRIPTION OF THE INVENTION

[Alkali-Free Glass Substrate]

Figure 1:
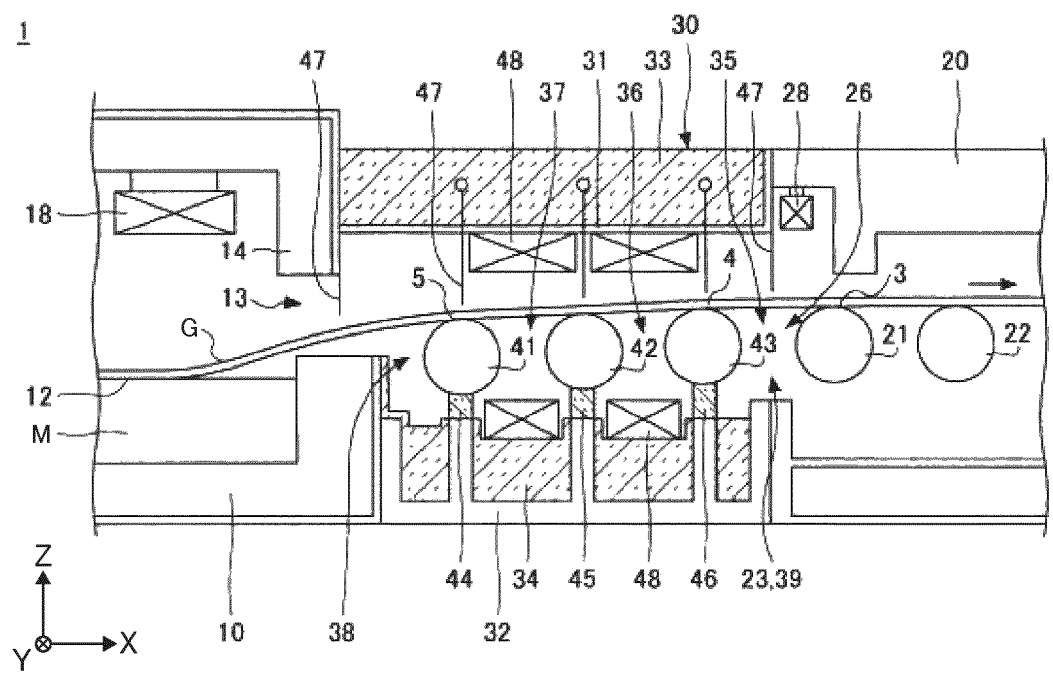
FIG. 1 is a partial cross-sectional view of an apparatus for manufacturing an alkali-free glass substrate according to one embodiment of the present invention.

The alkali-free glass substrate of the present invention is described below.

In the present invention, when two arbitrary sites in one main surface are selected, the absolute value of the difference between the thermal shrinkage ratio in an arbitrary direction at one site and the thermal shrinkage ratio in a direction orthogonal to the arbitrary direction at another site is 2 ppm or less. The thermal shrinkage ratio is calculated by measuring the deformation amount in the measuring direction of the glass substrate between before and after a heat treatment of raising the temperature from normal temperature to 600° C. at 100° C./hour, holding the glass substrate at 600° C. for 80 minutes, and lowering the temperature from 600° C. to normal temperature at 100° C./hour.

The thermal shrinkage ratio (C) between before and after the heat treatment can be calculated using the following formula:

$$C(\text{ppm}) = \Delta L(\mu m)/L(m)$$

in which

C: thermal shrinkage ratio (ppm), $\Delta L$: deformation amount (μm) of the glass substrate between before and after the heat treatment, and L: length (m) of the glass substrate before the heat treatment.

In this embodiment, two arbitrary sites within one main surface of the glass substrate having an alkali-free glass composition are selected, and the thermal shrinkage ratio $C_A$ in an arbitrary direction at one site A and the thermal shrinkage ratio $C_B$ in a direction orthogonal to the arbitrary direction described above at another site B are calculated. In addition, an anisotropic variation that is the absolute value $|C_A - C_B|$ of the difference between thermal shrinkage ratio $C_A$ and thermal shrinkage ratio $C_B$ is calculated. One site A and another site B may be the same site within a region.

The arbitrary direction at one site A is preferably the sheet width direction. In this case, the direction orthogonal to the arbitrary direction at another side B is the sheet drawing direction. However, the directions are not limited thereto and may be any as long as they have a relationship of being orthogonal to each other.

The size of the glass piece cut out from the left-side region L, the central region C and the right-side region R so as to calculate the thermal shrinkage ratio is not particularly limited. The size is, for example, 270 mm long side×50 mm short side×0.5 mm thickness, and the thermal shrinkage ratio is calculated by measuring the deformation amount of the long side of the glass piece between before and after the heat treatment.

In the TFT array fabrication process at the time of manufacture of a high-definition display for a mobile device, the maximum in-process temperature is 600° C. and the holding time is 5 minutes.

On the other hand, in the present invention, the thermal shrinkage ratio is calculated by measuring the deformation amount in the measuring direction of the glass substrate between before and after a heat treatment of raising the temperature from normal temperature to 600° C. at 100° C./hour, holding the glass substrate at 600° C. for 80 minutes, and lowering the temperature from 600° C. to normal temperature at 100° C./hour. The reason therefor is described below.

In order to evaluate the time dependency of the anisotropic variation of thermal shrinkage, the present inventors evaluated the thermal shrinkage ratio under the following two conditions for the regions L, C and R of an alkali-free glass substrate produced by the float process. As for the glass composition, the later-described glass 1 was employed.

Heat treatment condition 1: The temperature is raised from normal temperature to 600° C. at 200° C./hour, the glass substrate is held at 600° C. for 5 minutes, and the temperature is lowered from 600° C. to normal temperature at 200° ° C./hour.

Heat treatment condition 2: The temperature is raised from normal temperature to 600° C. at 100° C./hour, the glass substrate is held at 600° C. for 80 minutes, and the temperature is lowered from 600° C. to normal temperature at 100° C./hour.

With respect to the samples of the heat treatment conditions 1 and 2, the results from measuring the thermal shrinkage ratios in the sheet width direction and the sheet drawing direction of each of the regions L, C and R of the alkali-free glass substrate, and the anisotropic variation are shown in Table 1. The thermal shrinkage ratios in the sheet width direction of the regions L, C and R are designated as $C_{AL}$, $C_{AC}$, and $C_{AR}$, respectively, and the thermal shrinkage ratios in the sheet drawing direction of the regions L, C and R are designated as $C_{BL}$, $C_{BC}$, and $C_{BR}$, respectively. Out of the absolute value of the difference between the maximum value of the thermal shrinkage ratios $C_{AL}$, $C_{AC}$, and $C_{AR}$ and the minimum value of the thermal shrinkage ratios $C_{BL}$, $C_{BC}$, and $C_{BR}$ and the absolute value of the difference between the minimum value of the thermal shrinkage ratios $C_{AL}$, $C_{AC}$, and $C_{AR}$ and the maximum value of the thermal shrinkage ratios $C_{BL}$, $C_{BC}$, and $C_{BR}$, a larger value was calculated as the anisotropic variation. When the results under the heat treatment conditions 1 and 2 are compared, the absolute value of the thermal shrinkage ratio differed, but a significant difference was not produced in the anisotropic variation.

TABLE 1

| Heat Treatment Condition | 1 | 2 |
|---|---|---|
| Anisotropic variation $|C_A-C_B|$ [ppm] | 3.1 | 2.7 |
| Thermal shrinkage ratio $C_{AL}$ [ppm] | −6.7 | −45.4 |
| Thermal shrinkage ratio $C_{AC}$ [ppm] | −2.9 | −42.3 |
| Thermal shrinkage ratio $C_{AR}$ [ppm] | −5.5 | −43.4 |
| Thermal shrinkage ratio $C_{BL}$ [ppm] | −6.0 | −44.6 |
| Thermal shrinkage ratio $C_{BC}$ [ppm] | −4.4 | −42.7 |
| Thermal shrinkage ratio $C_{BR}$ [ppm] | −4.9 | −43.3 |

The results in Table 1 suggest that the deformation due to delayed elasticity is settled within 5 minutes. Accordingly, the anisotropic variation of thermal shrinkage ratio in the TFT array fabrication process at the time of manufacture of a high-definition display for a mobile device can be evaluated by the difference of thermal shrinkage ratio under the heat treatment condition 2. In the heat treatment condition 2, the absolute value of the thermal shrinkage ratio is an order of magnitude larger than that in the heat treatment condition 1, and this makes it easy to isolate and evaluate the thermal shrinkage attributable to the structure relaxation and the thermal shrinkage attributable to the delayed elasticity.

For this reason, in the present invention, the heat treatment condition 2 was employed for the evaluation of anisotropic variation. Here, although the anisotropic variation $|C_A-C_B|$ in the heat treatment condition 2 was more than 2 ppm, the values shown in Table 1 are only results from evaluating the time dependency of anisotropic variation at the time of occurrence of thermal shrinkage and do not constitute Examples of the present invention.

In the alkali-free glass substrate of the present invention, the anisotropic variation determined by the above-described procedure is 2 ppm or less, and the anisotropic variation of thermal shrinkage ratio in the TFT array fabrication process at the time of manufacture of a high-definition display for a mobile device is therefore very small, thus solving the problem that the opening ratio cannot be increased due to the variation of thermal shrinkage ratio.

In the alkali-free glass substrate of the present invention, the anisotropic variation determined by the above-described procedure is preferably 1.5 ppm or less, more preferably 1.0 ppm or less.

In the fusion process and the float process, which are a typical mass-production process of a glass substrate, the stress in the sheet drawing direction and the stress in the sheet width direction generated in the glass ribbon differ, and a difference is produced between the thermal shrinkage ratios $C_A$ and $C_B$ calculated by the above-described procedure. This difference gives rise to the anisotropic variation of thermal shrinkage ratio.

In order to suppress the anisotropic variation of thermal shrinkage ratio, the value of the stress applied to the glass ribbon in the annealing step of the glass ribbon is preferably controlled to apply a uniform stress to the sheet drawing direction in the sheet width direction and apply a uniform stress to the sheet width direction in the sheet drawing direction.

It is difficult to actually measure the stress distribution generated in the glass ribbon at the time of manufacture, but, for example, when the temperature in the sheet width direction can be made uniform during annealing, the stress in the sheet drawing direction can be made uniform in the sheet width direction.

As long as the temperature in the sheet width direction is uniform in the vicinity of the glass transition point Tg, in both the sheet drawing direction and the sheet width direction, the stress in the relevant direction becomes uniform. By equalizing the stress in the sheet drawing direction and the stress in the sheet width direction, the anisotropic variation of thermal shrinkage ratio, calculated by the procedure described above, is suppressed, and isotropic thermal shrinkage occurs.

As described above, in the alkali-free glass substrate used in a high-definition display application for a mobile device, the absolute value of the thermal shrinkage ratio in the TFT array fabrication process is preferably small.

Accordingly, in the alkali-free glass substrate of the present invention, the absolute value of the thermal shrinkage ratio $C_A$ in an arbitrary direction at one site A and the absolute value of the thermal shrinkage ratio $C_B$ in a direction orthogonal to the arbitrary direction described above at another site B are preferably 100 ppm or less, more preferably 70 ppm or less, still more preferably 50 ppm or less.

Other than the thermal shrinkage ratio, preferable properties for the alkali-free glass substrate of the present invention are described below.

In the alkali-free glass substrate of the present invention, the strain point is preferably 630° C. or more, because the thermal shrinkage at the time of panel production is suppressed.

In the alkali-free glass substrate of the present invention, the strain point is more preferably 650° C. or more, still more preferably 670° C. or more, yet still more preferably 680° C. or more, even yet still more preferably 700° C. or more.

In the alkali-free glass substrate of the present invention, the temperature $T_2$ at which the viscosity reaches $10^2$ dPa·s is preferably from 1,620 to 1,820° C. When $T_2$ is 1,820° C. or less, melting of glass is facilitated. $T_2$ is more preferably 1,770° C. or less, still more preferably 1,720° C. or less. $T_2$ is more preferably 1,630° C. or more, still more preferably 1,640° C. or more.

As long as an alkali component is substantially (i.e., excluding an unavoidable impurity) not contained, the alkali-free glass substrate of the present invention can be appropriately selected from a wide range of compositions but preferably includes an alkali-free glass including, in terms of mass % on the basis of oxides, $SiO_2$: from 54 to 68%,
$Al_2O_3$: from 10 to 23%,
$B_2O_3$: from 0 to 12%,
MgO: from 0 to 12%,
CaO: from 0 to 15%,
SrO: from 0 to 16%, and
BaO: from 0 to 15%,
provided that MgO+CaO+SrO+BaO: from 8 to 26%.

With respect to the preferable composition of the alkali-free glass substrate of the present invention, the composition ranges of respective components are described below.

If the content of $SiO_2$ is less than 54% (mass %, unless otherwise indicated, hereinafter the same), the strain point does not sufficiently rise and not only the thermal expansion coefficient increases but also the density rises. Accordingly, the content thereof is preferably 54% or more, more preferably 55% or more, still more preferably 56% or more.

If the content thereof exceeds 68%, the meltability is reduced and the temperature $T_2$ at which the glass viscosity reaches $10^2$ dPa·s, or the temperature $T_4$ at which the viscosity reaches $10^4$ dPa·s, rises. Accordingly, the content thereof is preferably 68% or less, more preferably 66% or less, still more preferably 64% or less.

$Al_2O_3$ suppresses phase separation of glass, decreases the thermal expansion coefficient, and raises the strain point. However, if the content thereof is less than 10%, these effects are not brought out and in addition, the content of other components raising the expansion coefficient is increased, resulting in large thermal expansion. Accordingly, the content thereof is preferably 10% or more, more preferably 14% or more, still more preferably 16% or more, yet still more preferably 18% or more.

If the content thereof exceeds 23%, meltability may be degraded. Accordingly, the content thereof is preferably 23% or less, more preferably 22% or less, still more preferably 21% or less.

$B_2O_3$ is not essential but may be contained so as to improve the melting reactivity of glass. However, if the content thereof is too large, the Young's modulus decreases, and the absolute value of the thermal shrinkage ratio increases. Accordingly, the content thereof is preferably 12% or less, more preferably 7% or less, still more preferably 5% or less, yet still more preferably 3% or less, even yet still more preferably 2% or less, and particularly preferably 1.5% or less.

MgO is not essential but may be contained, because among alkaline earths, this component has a feature of increasing the Young's modulus while maintaining the density low without increasing the expansion coefficient as well as a feature of improving also the meltability. For bringing out this feature, the content thereof is preferably 1% or more, more preferably 3% or more, still more preferably 5% or more. However, if the content thereof is too large, the devitrification temperature rises. Accordingly, the content thereof is preferably 12% or less, more preferably 10% or less.

CaO is not essential but may be contained, because among alkaline earths, next to MgO, this component has a feature of increasing the Young's modulus while maintaining the density low without increasing the expansion coefficient as well as a feature of improving also the meltability. However, if the content thereof is too large, the devitrification temperature may rise or a large amount of phosphorus that is an impurity in limestone ($CaCO_3$) serving as a CaO source may be mixed. Accordingly, the content thereof is preferably 15% or less, more preferably 12% or less. In order to bring out the feature described above, the content thereof is preferably 3% or more.

SrO is not essential but may be contained so as to enhance the meltability without raising the devitrification temperature of glass. In order to bring out this effect, the content thereof is preferably 0.1% or more, more preferably 1% or more, still more preferably 2% or more. However, if the content thereof is too large, the thermal expansion coefficient may increase. Accordingly, the content thereof is set to be 16% or less. The content thereof is preferably 10% or less, more preferably 6% or less.

BaO is not essential but may be contained so as to enhance the meltability. However, if the content thereof is too large, the expansion coefficient and the density are excessively increased. Accordingly, the content thereof is set to be 15% or less. The content thereof is preferably 10% or less.

The total amount of MgO, CaO, SrO and BaO is 8% or more, because if the total amount thereof is less than 8%, it is likely that the photoelastic constant becomes large and the meltability is reduced. Since MgO, CaO, SrO and BaO are preferably contained in a large amount with the purpose to reduce the photoelastic constant, the total content thereof is preferably 10% or more, more preferably 13% or more, still more preferably 16% or more. The total content thereof is 26% or less, because if it exceeds 26%, the average thermal expansion coefficient cannot be reduced, and the stain point may be lowered. The total content thereof is preferably 22% or less, more preferably 20% or less.

In addition to these main components, 0.1% or less of an alkali oxide ($Li_2O$, $Na_2O$, $K_2O$) or a transition metal oxide (e.g., $Fe_2O_3$, NiO, $Cr_2O_3$, CuO) may be contained as a component unavoidably getting mixed in from the glass raw material. In order to increase the meltability or clarification, less than 1% of $SnO_2$, $SO_3$, Cl, or F may be contained. Furthermore, as long as the effects of the present invention are not impaired, less than 5% of a metal oxide (ZnO, $ZrO_2$, $Ta_2O_5$, $Nb_2O_5$, $TiO_2$, $Y_2O_3$, $La_2O_3$, $Gd_2O_3$, $Yb_2O_3$) may be contained.

When the alkali-free glass substrate of the present invention is used in a high-definition display application for a mobile device, the variation of thermal shrinkage ratio in the TFT array fabrication process can be reduced, so that a large substrate size than ever before can be designed. Specifically, the substrate size is preferably (1,450 mm×1,450 mm) or more (more than G5.5). The substrate size is more preferably (1,850 mm×1,500 mm) or more (G6 or more), still more preferably (2,250 mm×1,950 mm) or more (G7.5 or more), yet still more preferably (2,500 mm×2,200 mm) or more (G8 or more), even yet still more preferably (3,000 mm×2,800 mm) or more.

Since the alkali-free glass substrate of the present invention is used in a high-definition display application for a mobile device, the thickness thereof is preferably 0.5 mm or less, more preferably 0.4 mm or less, still more preferably 0.3 mm or less.

Since the alkali-free glass substrate of the present invention is used in a high-definition display application for a mobile device, the thickness deviation thereof is preferably 20 µm or less, more preferably 15 µm or less, still more preferably 10 µm or less.

[Apparatus for Manufacturing Alkali-Free Glass Substrate]

The apparatus for manufacturing the alkali-free glass substrate is described below by referring to the drawing. The apparatus for manufacturing the alkali-free glass substrate may be applied to the float process or to the fusion process but is described below by taking the float process as an example.

In the drawing, an XYZ coordinate system is depicted appropriately as a three-dimensional Cartesian coordinate system, where the Z-axis direction is the vertical direction, the X-axis direction is the length direction of a float bath 10 illustrated in FIG. 1, and the Y-axis direction is the width direction of the float bath 10. The length direction of the float bath 10 is the horizontal direction in FIG. 1 and in the present description, is the sheet drawing direction of a glass ribbon G. The width direction of the float bath 10 is the sheet width direction of the glass ribbon G.

In the present description, the sheet drawing direction of the glass ribbon G is the direction, in a planar view, in which the glass ribbon G is conveyed. In addition, in the present description, the upstream side and the downstream side are referred to with respect to the sheet drawing direction (X-axis direction) of the glass ribbon G inside the apparatus 1 for manufacturing the alkali-free glass substrate. More specifically, in the present description, the +X side is the downstream side, and the −X side is the upstream side.

Furthermore, in the present description, the left side and the right side are referred to with respect to the sheet width direction (Y-axis direction) of the glass ribbon G inside the apparatus 1 for manufacturing the alkali-free substrate and respectively indicate the left side and the right side as viewed toward the downstream side (+X side) of the sheet drawing direction (X-axis direction). That is, in the present description, the +Y side is the left side, and the −Y side is the right side.

FIG. 1 is a partial cross-sectional view of an apparatus for manufacturing the alkali-free glass substrate according to one embodiment of the present invention. The configuration of the manufacturing apparatus 1 for the alkali-free glass substrate according to one embodiment of the present invention is described.

The glass raw materials for respective components usually used are mixed to afford the target components, and the mixture is continuously charged into a glass melting furnace (not shown) and heated/melted at 1,500 to 1,700° C. to obtain a molten glass. Before supplying the molten glass into a float bath 10, the bubbles contained inside the molten glass are preferably removed. A glass ribbon G is formed by continuously supplying the molten glass into the float bath 10.

The glass ribbon G formed to have a desired width or thickness on a molten metal M bath surface 12 in the float bath 10 is pulled out from the bath surface 12 by traction force of lift-out rolls 41 to 43 and lehr rolls 21 and 22. The glass ribbon G is then carried into a chamber 30 from the outlet 13 of the float bath 10 and conveyed by the lift-out rolls 41 to 43. Subsequently, the glass ribbon G is carried into an annealing furnace 20 and annealed while being conveyed by the lehr rolls 21 and 22. Thereafter, the glass ribbon G is discharged to the downstream side (+X side) from the annealing furnace 20, cooled to near room temperature, and then cut into a predetermined dimension to provide an alkali-free glass substrate.

In the case of manufacturing a glass substrate for a liquid crystal display device by float process, the method further has a polishing step of polishing the glass substrate so as to improve the flatness of the glass substrate. In the polishing step, mainly, the tin-contacted surface of the glass substrate is mechanically polished or chemically and mechanically polished. From the viewpoint of enhancing the productivity, the removal amount is preferably 3 µm or less, more preferably 2 µm or less, still more preferably 1.5 µm or less, yet still more preferably 1.0 µm or less.

The upper space inside the float bath 10 is filled with a reducing gas containing nitrogen and hydrogen so as to prevent oxidation of the molten metal M. In addition, the upper space inside the float bath 10 is set to a higher pressure than the atmospheric pressure so as to prevent air from externally flowing in.

A bath heater 18 for adjusting the glass ribbon G to a plastically deformable temperature is provided near the outlet 13 inside the float bath 10. The temperature of the glass ribbon G near the outlet 13 inside the float bath 10 is appropriately set according to the kind, etc. of the glass but is preferably, for example, a temperature higher by 30 to 80° C. than the glass transition point Tg.

The annealing furnace 20 is open to the outside at the outlet on the downstream side. Accordingly, the inside of the annealing furnace 20 is basically kept to an atmosphere containing oxygen. The inside of the annealing furnace 20 communicates with the inside of the float bath 10 via the inside of the chamber 30.

Inside the annealing furnace 20, a lehr heater 28, etc. are provided, in addition to the lehr rolls 21 and 22. Each of the lehr rolls 21 and 22 is rotatably driven by a driving device such as motor and conveys the glass ribbon G in the horizontal direction by its driving force.

The chamber 30 is constituted of a hood 31 provided above the glass ribbon G, a dross box 32 provided below the glass ribbon G, etc. The chamber 30 may have a heat insulated structure, where, for example, as illustrated in FIG. 1, at least part of the outer wall of the hood 31 is covered with a heat-insulating material 33 and at least part of the inner wall of the dross box 32 is covered with a heat-insulating material 34. By using the heat-insulating materials 33 and 34, the temperature distribution of the glass ribbon G can be stabilized by suppressing heat dissipation from the chamber 30.

Inside the chamber 30, contact members 44 to 46, a drape 47, a heater 48, etc. are provided, in addition to the lift-out rolls 41 to 43. Each of the lift-out rolls 41 to 43 is rotatably driven by a driving device such as motor and conveys the glass ribbon G toward an oblique upper side by its driving force. The number of lift-out rolls is not particularly limited as long as it is a plural number. The contact members 44 to 46 are provided below the lift-out rolls 41 to 43.

Each of the contact members 44 to 46 is formed of carbon, etc. The contact members 44 to 46 are respectively in sliding contact with outer circumferential surfaces of corresponding lift-out rolls 41 to 43 to partition the space below the glass ribbon G into a plurality of spaces 35 to 38.

The drape 47 is provided above the glass ribbon G and is a member for partitioning the space above the glass ribbon G. In the space above the glass ribbon G, a reducing gas flowed out from the outlet 13 of the float bath 10 flows toward the inlet 23 of the annealing furnace 20, and the drape 47 inhibits the reducing gas from flowing into the annealing furnace 20.

The drape 47 is constituted of a refractory material such as iron or steel material or glass material. The drape 47 is configured to be slightly spaced from the top surface of the glass ribbon G so as not to prevent conveyance of the glass ribbon G. The drape 47 is hung on the hood 31, and a plurality of drapes are provided along the sheet drawing direction (X-axis direction) of the glass ribbon G.

The heater 48 is provided on both the upper and lower sides of the glass ribbon G to be spaced from one another and on each side, provided in a plurality of rows along the sheet drawing direction (X-axis direction) of the glass ribbon G. The heater 48 in each row is provided, for example, as illustrated in FIG. 1, between the drapes 47 or between the contact members 44 to 46. The heater 48 in each row may be divided in the sheet width direction (Y-axis direction) of the glass ribbon G.

In this way, a plurality of heaters 48 are arranged in a divided manner in the sheet width direction (Y-axis direction) or sheet drawing direction (X-axis direction) of the glass ribbon G or in the vertical direction (Z-axis direction), and calorific values thereof are independently controlled, whereby the temperature distribution of the glass ribbon G can be precisely adjusted. The plurality of heaters 48 may be independently controlled, or some may be controlled together.

[Method for Manufacturing Alkali-Free Glass Substrate]

The method for manufacturing the alkali-free glass substrate is described below.

The method for manufacturing an alkali-free glass substrate of this embodiment includes: a melting step S1 of melting a glass raw material in a glass melting furnace to obtain a molten glass; a forming step S2 of forming the molten glass into a glass ribbon in a forming furnace; and an annealing step S3 of annealing the glass ribbon in an annealing furnace to obtain a sheet glass.

In the annealing step S3, the cooling rate of the glass ribbon when the logarithm of the viscosity (dPa·s) of the glass ribbon is from 12.5 to 14.0 is larger in the end part than in the central part in the sheet width direction, the cooling rate difference in the sheet drawing direction between the central part and the end part in the sheet width direction of the glass ribbon is 100° C./min or less, and the temperature difference between the central part and the end part in the sheet width direction of the glass ribbon is 15° C. or less. By setting the cooling rate difference to be 100° C./min or less, the fictive temperature of glass can be made uniform. In addition, by setting the temperature difference to be 15° C. or less, the stress in the sheet drawing direction can be made uniform in the sheet width direction.

In the annealing step S3, when the temperature of the glass ribbon is higher in the end part than in the central part in the sheet width direction, the cooling rate difference is 70° C./min or less at the temperature difference of 10° C. or less and the cooling rate difference is 40° C./min or less at the temperature difference of more than 10° C. When the cooling rate is larger in the end part than in the central part of the sheet width direction and the temperature is higher in the end part than in the central part in the sheet width direction, thermal shrinkage arising from structural relaxation and thermal shrinkage arising from delayed elasticity are combined, and the anisotropic variation tends to be increased. Accordingly, in this embodiment, the anisotropic variation is suppressed by reducing the cooling rate difference as the temperature difference becomes large.

On the other hand, when the temperature of the glass ribbon is lower in the end part than in the central part in the sheet width direction or equal between these parts, the cooling rate difference is 100° C./min or less. This is because when the cooling rate is larger in the end part than in the central part in the sheet width direction and the temperature is lower in the end part than in the central part in the sheet width direction, thermal shrinkage arising from structural relaxation and thermal shrinkage arising from delayed elasticity are canceled, and the anisotropic variation tends to be decreased.

In the annealing step S3, the cooling rate in the sheet drawing direction of the glass ribbon is preferably from 30 to 200° C./min, more preferably from 40 to 180° C./min. When the cooling rate is 200° C./min or less, the glass substrate finally obtained by cutting can be reduced in the absolute value of thermal shrinkage ratio, the strain, the warpage, etc.

In the method for manufacturing an alkali-free glass substrate of this embodiment, the length in the sheet width direction of the sheet glass is preferably 5 m or more, more preferably 5.5 m or more, still more preferably 6 m or more. As the length in the sheet width direction of the sheet glass is larger, a plurality of large TFT glass substrates can be sized at the same time.

In the method for manufacturing an alkali-free glass substrate of this embodiment, the molten glass obtained by float process is preferably formed into a glass ribbon G, and in this case, the manufacturing apparatus 1 for an alkali-free glass substrate is used. The region where the logarithm of the viscosity (dPa·s) of the glass ribbon G is from 12.5 to 14.0 corresponds to the region of the chamber 30 and is in the temperature range from (glass transition point Tg−30) to (glass transition point Tg+20)° C. Accordingly, in the float process, the temperature in the sheet width direction (Y-axis direction) of the glass ribbon G upstream and downstream of the chamber 30 and the cooling rate in the sheet drawing direction (X-axis direction) of the sheet width-direction central part and end part of the glass ribbon G in the chamber 30 are controlled using the plurality of heaters 48, etc. of the chamber 30, whereby the difference of the thermal shrinkage ratio in the sheet width direction as well as in the sheet drawing direction can be reduced.

Figure 2:
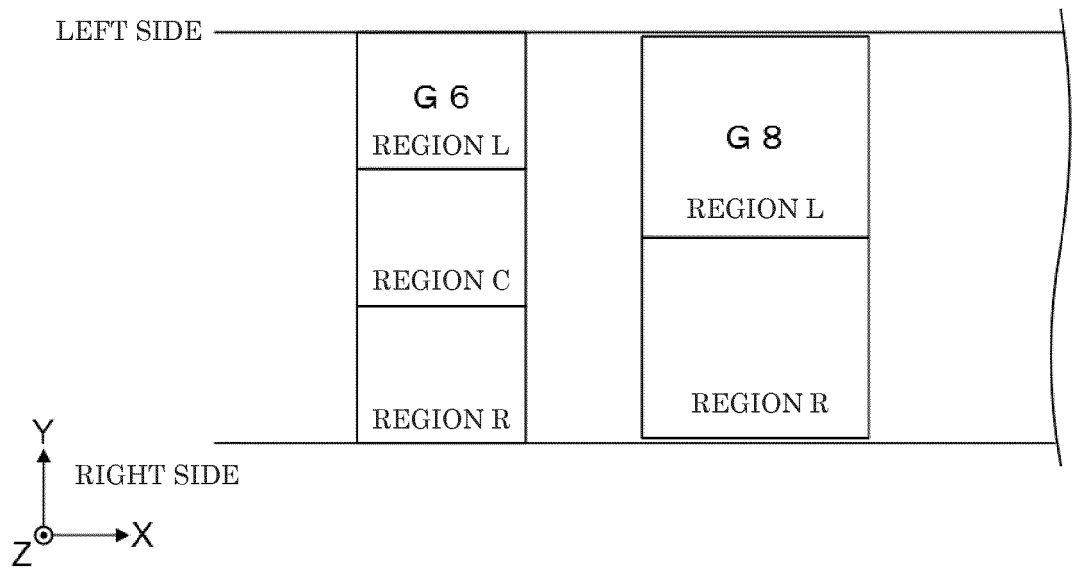
FIG. 2 is a schematic view illustrating the sizing of a sheet glass obtained by a float process in one embodiment of the present invention.

FIG. 2 is a schematic view illustrating the sizing of a sheet glass obtained by a float process in one embodiment of the present invention. Here, the sheet glass before cutting has a selvage part outside the product region and a thin sheet part inside the product region, but in FIG. 2, the selvage part is omitted.

In the float process, the effective width of the sheet glass is large, and a plurality of large TFT glass substrates can be sized at the same time. For example, in the embodiment illustrated in FIG. 2, two glass substrates of 2,500 mm×2,200 mm (G8) and three glass substrates of 1,850 mm×1,500 mm (G6) are sized and cut out from the sheet glass. The length in the sheet width direction (Y-axis direction) of the thin sheet part of the sheet glass is preferably 4 m or more, more preferably 4.5 m or more, still more preferably 5 m or more.

EXAMPLES

The glass raw materials for respective components were mixed to afford the target composition, the mixture was melted in a glass melting furnace, and the obtained molten glass was formed into a glass ribbon G by a float process.

In Examples 1 to 3 and Comparative Examples 1 to 3, the target composition is the following glass 1, and in Example 4 and Comparative Example 4, the target composition is the following glass 2.

(Glass 1)
 SiO$_2$: 61%
 Al$_2$O$_3$: 20%
 B$_2$O$_3$: 1.5%
 MgO: 5.5%
 CaO: 4.5%
 SrO: 7%
 BaO: 0%
 MgO+CaO+SrO+BaO: 17%

(Glass 2)
 SiO$_2$: 60%
 Al$_2$O$_3$: 17%
 B$_2$O$_3$: 8%
 MgO: 3%
 CaO: 4%
 SrO: 8%
 BaO: 0%
 MgO+CaO+SrO+BaO: 15%

The temperature of the glass ribbon G in the chamber 30 is near the glass transition point Tg. The temperature in the sheet width direction (Y-axis direction) of the glass ribbon G on the upstream side (−X side) of the chamber 30 was measured at three sites. i.e., left-side edge part L1, central part C1, and right-side end part R1. The temperatures of left-side end part L1, central part C1, and right-side end part R1 are designated as $T_{L1}$, $T_{C1}$, and $T_{R1}$, respectively. Similarly, the temperature in the sheet width direction (Y-axis direction) of the glass ribbon G on the downstream side (+X side) of the chamber 30 was measured at three sites, i.e., left-side end part L2, central part C2, and right-side end part R2. The temperatures of left-side end part L2, central part C2, and right-side end part R2 are designated as $T_{L2}$, $T_{C2}$, and $T_{R2}$, respectively. The viscosity of the glass ribbon G in the chamber 30 is a value converted from the temperature of the glass ribbon G. The viscosities corresponding to the temperatures $T_{L1}$, $T_{C1}$, $T_{R1}$, $T_{L2}$, $T_{C2}$, and $T_{R2}$ of the glass ribbon G are designated as $\eta_{L1}$, $\eta_{C1}$, $\eta_{R1}$, $\eta_{L2}$, $\eta_{C2}$, and $\eta_{R2}$, respectively.

Here, the average viscosities $\eta_1$ and $\eta_2$ (dPa·s) in the sheet width direction (Y-axis direction) of the glass ribbon G on the upstream side (−X side) and the downstream side (+X side) of the chamber 30, the temperature differences $\Delta T_1$, $\Delta T_2$, and $\Delta T$ (° C.) in the sheet width direction (Y-axis direction) of the glass ribbon G on the upstream side (−X side) and the downstream side (+X side) of the chamber 30, the viscosity differences $\Delta\eta_1$ and $\Delta\eta_2$, the cooling rates $R_C$ and $R_E$ (° C./min) in the sheet drawing direction (X-axis direction) at the central part and end part in the sheet width direction of the glass ribbon G in the chamber 30, and the cooling rate difference $\Delta R$ (° C./min), which are shown in Table 2, are described.

The average viscosities $\eta_1$, and $\eta_2$ are respectively an average value of the viscosities $\eta_{L1}$, $\eta_{C1}$ and $\eta_{R1}$ and an average value of the viscosities $\eta_{L2}$, $\eta_{C2}$ and $\eta_{R2}$. The temperature difference $\Delta T_1$ is a value having a larger absolute value out of $(T_{L1}-T_{C1})$ and $(T_{R1}-T_{C1})$, and the temperature difference $\Delta T_2$ is a value having a larger absolute value out of $(T_{L2}-T_{C2})$ and $(T_{R2}-T_{C2})$. The temperature difference $\Delta T$ is an average value of the temperature difference $\Delta T_1$ and the temperature difference $\Delta T_2$. The cooling rate $R_C$ is a value obtained by dividing $(T_{C1}-T_{C2})$ by the time t over which the glass ribbon G is conveyed from upstream to downstream of the chamber 30. The cooling rate $R_E$ is a value calculated by dividing the average value of $(T_{L1}-T_{L2})$ and $(T_{R1}-T_{R2})$ by the time t. The cooling rate difference $\Delta R$ is a value obtained by subtracting the cooling rate $R_C$ from the cooling rate $R_E$.

Figure 3:
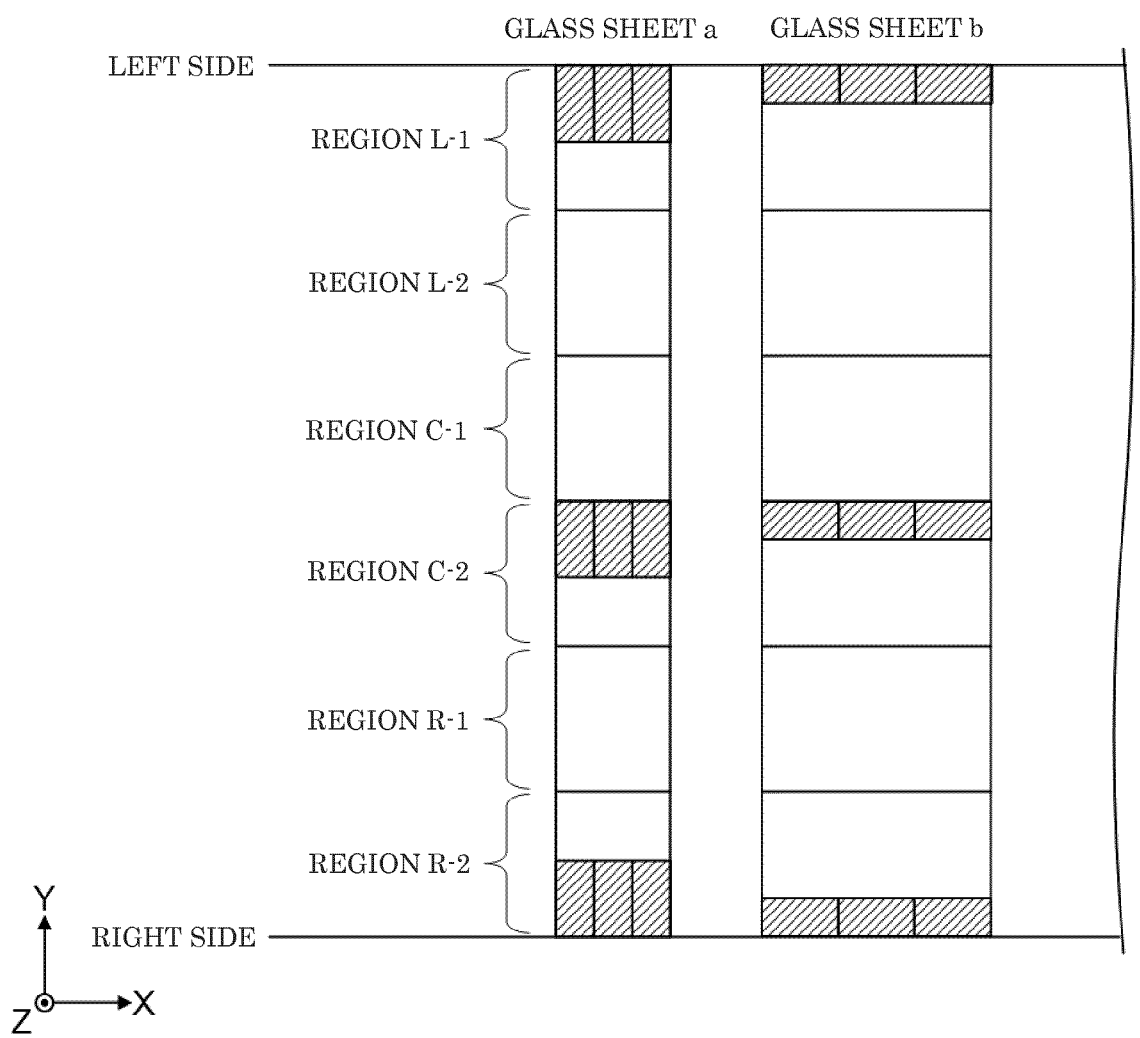
FIG. 3 is a schematic view illustrating the division of a sheet glass for obtaining glass pieces of Examples and Comparative Examples.

FIG. 3 is a schematic view illustrating the division of a sheet glass for obtaining glass pieces of Examples and Comparative Examples. As with FIG. 2, the selvage part is omitted in FIG. 3.

After annealing, the sheet glass was divided into six in the sheet width direction (Y-axis direction). The region on the leftmost side (+Y side) is called a region L-1, and the regions in order from the region L-1 to the right side (−Y side) are called region L-2, region C-1, region C-2, region R-1, and region R-2. The region R-2 is on the rightmost side (−Y side).

Three sheets of each of the following glass sheets a and b were cut out from the regions L-1, C-2 and R-2.

Glass sheet a: 200 mm×400 mm×0.5 mm (thickness), with the long side being in the sheet width direction.

Glass sheet b: 400 mm×200 mm×0.5 mm (thickness), with the long side being in the sheet drawing direction.

Furthermore, two sheets of each of the following glass pieces A and B were cut out from the glass sheets a and b. In other words, six sheets of each of the following glass pieces A and B were cut out from the regions L-1, C-2 and R-2.

Glass piece A: 50 mm×270 mm×0.5 mm (thickness), with the long side being in the sheet width direction.

Glass piece B: 270 mm×50 mm×0.5 mm (thickness), with the long side being in the sheet drawing direction.

The deformation amount of the long side of each of the glass pieces A and B between before and after a heat treatment of raising the temperature from normal temperature to 600° C. at 100° C./hour, holding the glass pieces A and B at 600° C. for 80 minutes, and lowering the temperature from 600° C. to normal temperature at 100° C./hour was measured, and the thermal shrinkage ratio was calculated. Each of the thermal shrinkage ratios in the sheet width direction and the sheet drawing direction in respective regions is the average value of thermal shrinkage ratios of six sheets of each of the glass piece A and B.

The results are shown in Table 2. The thermal shrinkage ratios in the sheet width direction (Y-axis direction) of the regions L, C and R are designated as $C_{AL}$, $C_{AC}$, and $C_{AR}$, respectively, and the thermal shrinkage ratios in the sheet drawing direction (X-axis direction) of the regions L, C, and R are designated as $C_{BL}$, $C_{BC}$, and $C_{BR}$, respectively. The absolute value of the difference between the maximum value of the thermal shrinkage ratios $C_{AL}$, $C_{AC}$, and $C_{AR}$ and the minimum value of the thermal shrinkage ratios $C_{BL}$, $C_{BC}$, and $C_{BR}$, or the absolute value of the difference between the minimum value of the thermal shrinkage ratios $C_{AL}$, $C_{AC}$, and $C_{AR}$ and the maximum value of the thermal shrinkage ratios $C_{BL}$, $C_{BC}$, and $C_{BR}$, whichever is greater, was calculated as the anisotropic variation. When the anisotropic variation is 2 ppm or less, irrespective of the dimension of the sheet glass sized, the anisotropic variation of the obtained glass substrate becomes 2 ppm or less. Here, the thermal shrinkage ratios of the regions L, C and R correspond to the thermal shrinkage ratios of each of the glass pieces A and B obtained from the regions L-1, C-2, and R-2, respectively.

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Glass | 1 | 1 | 1 | 2 | 1 | 1 | 1 | 2 |
| Anisotropic variation $|C_A - C_B|$ [ppm] | 0.9 | 1.6 | 1.3 | 1.4 | 5.1 | 3.1 | 2.9 | 2.1 |
| Thermal shrinkage ratio $C_{AL}$ [ppm] | −42.5 | −43.5 | −43.6 | −128.4 | −43.9 | −41.8 | −44.2 | −130.5 |
| Thermal shrinkage ratio $C_{AC}$ [ppm] | −42.2 | −44.2 | −42.4 | −128.6 | −41.1 | −42.3 | −42.9 | −131.7 |
| Thermal shrinkage ratio $C_{AR}$ [ppm] | −42.2 | −43.1 | −42.8 | −128.2 | −42.7 | −41.6 | −43.7 | −132.9 |
| Thermal shrinkage ratio $C_{BL}$ [ppm] | −42.1 | −43.6 | −43.7 | −128.8 | −44.6 | −42.2 | −45.8 | −131.6 |
| Thermal shrinkage ratio $C_{BC}$ [ppm] | −42.7 | −43.4 | −42.5 | −127.7 | −40.5 | −42.3 | −43.5 | −130.8 |
| Thermal shrinkage ratio $C_{BR}$ [ppm] | −43.1 | −44.7 | −43.5 | −127.2 | −46.2 | −44.7 | −44.5 | −132.7 |
| Temperature difference $\Delta T_1$ [° C.] | 9.3 | 10.4 | −13.5 | 15.7 | 15.1 | 10.1 | −17.8 | −14.2 |
| Logarithm of viscosity difference $\Delta \eta_1$ [dPa·s] | 0.34 | 0.39 | −0.52 | 0.51 | 0.56 | 0.37 | −0.69 | −0.55 |
| Temperature difference $\Delta T_2$ [° C.] | 6.6 | 7.7 | −15.4 | 12.6 | 12.4 | 6.2 | −22.7 | −20.7 |
| Logarithm of viscosity difference $\Delta \eta_2$ [dPa·s] | 0.25 | 0.3 | −0.61 | 0.42 | 0.47 | 0.24 | −0.92 | −0.78 |
| Temperature difference $\Delta T$ [° C.] | 8.0 | 9.1 | −14.5 | 14.2 | 13.8 | 8.2 | −20.3 | −17.5 |
| Cooling rate $R_E$ [° C./min] | 139 | 114 | 176 | 73 | 133 | 136 | 220 | 57 |
| Cooling rate $R_C$ [° C./min] | 76 | 67 | 80 | 46 | 66 | 62 | 83 | −17 |
| Cooling rate difference $\Delta_R$ [° C./min] | 63 | 47 | 97 | 27 | 67 | 74 | 137 | 74 |
| Logarithm of average viscosity $\eta_1$ [dPa·s] | 13.2 | 13.2 | 13.5 | 12.6 | 13.1 | 13.7 | 13.7 | 13.0 |
| Logarithm of Average viscosity $\eta_2$ [dPa·s] | 13.6 | 13.6 | 13.8 | 12.8 | 13.5 | 13.6 | 14.0 | 13.1 |

In Examples 1, 2 and 4 and Comparative Examples 1 and 2, since temperature differences $\Delta T_1$, $\Delta T_2$ and $\Delta T$ exceeded 0, the temperature of the end part in the sheet width direction of the glass ribbon G within the chamber 30 was higher than the temperature in the central part.

In Example 1, the temperature difference $\Delta T$ was 8.0° C., the cooling rate difference $\Delta R$ was 63° C./min, and the anisotropic variation $|C_A-C_B|$ was 0.9 ppm.

In Example 2, the temperature difference $\Delta T$ was 9.1° C., the cooling rate difference $\Delta R$ was 47° C./min, and the anisotropic variation $|C_A-C_B|$ was 1.6 ppm.

In Example 4, the temperature difference $\Delta T$ was 14.2° C., the cooling rate difference $\Delta R$ was 27° C./min, and the anisotropic variation $|C_A-C_B|$ was 1.4 ppm.

In Comparative Example 1, the temperature difference $\Delta T$ was 13.8° C., the cooling rate difference $\Delta R$ was 67° C./min, and the anisotropic variation $|C_A-C_B|$ was 5.1 ppm.

In Comparative Example 2, the temperature difference $\Delta T$ was 8.2° C., the cooling rate difference $\Delta R$ was 74° C./min, and the anisotropic variation $|C_A-C_B|$ was 3.1 ppm.

Next, in Example 3 and Comparative Examples 3 and 4, since temperature differences $\Delta T_1$, $\Delta T_2$ and $\Delta T$ were less than 0, the temperature of the end part in the sheet width direction of the glass ribbon G within the chamber 30 was lower than the temperature in the central part.

In Example 3, compared with Comparative Example 3, the temperature difference $\Delta T$ was −14.5° C., the cooling rate difference $\Delta R$ was 97° C./min, and the anisotropic variation $|C_A-C_B|$ was 1.3 ppm.

In Comparative Example 3, the temperature difference $\Delta T$ was −20.3° C., the cooling rate difference $\Delta R$ was 137° C./min, and the anisotropic variation $|C_A-C_B|$ was 2.9 ppm.

In Comparative Example 4, the temperature difference $\Delta T$ was −17.5° C., the cooling rate difference $\Delta R$ was 74° C./min, and the anisotropic variation $|C_A-C_B|$ was 2.1 ppm.

The present application is based on Japanese Patent Application No. 2016-051002 filed on Mar. 15, 2016, the contents of which are incorporated herein by reference.

DESCRIPTION OF REFERENCE NUMERALS AND SIGNS

1 Manufacturing apparatus
10 Float bath
12 Bath surface
13 Outlet
18 Bath heater
20 Annealing furnace
21, 22 Lehr roll
23 Inlet
28 Lehr heater
30 Chamber
31 Hood
32 Dross box
33, 34 Heat-insulating material
35 to 38 Space
41 to 43 Lift-out roll
44 to 46 Contact member
47 Drape
48 Heater
G Glass ribbon
M Molten metal

What is claimed is:
1. An alkali-free glass substrate comprising:
a main surface with a first site and a second site,
wherein an anisotropic variation of the alkali-free glass substrate is 2 ppm or less, wherein the anisotropic variation is an absolute value of a difference between a first thermal shrinkage ratio in an arbitrary direction from the first site and a second thermal shrinkage ratio in a direction orthogonal to the arbitrary direction from the second site,
wherein the first thermal shrinkage ratio and the second thermal shrinkage ratio are calculated by measuring a deformation amount in a measuring direction of the glass substrate between, before, and after a heat treatment of:
raising a temperature from normal temperature to 600° C. at 100° C./hour, holding the glass substrate at 600° C. for 80 minutes, and lowering the temperature from 600° C. to normal temperature at 100° C./hour.

2. The alkali-free glass substrate according to claim 1, wherein a first absolute value of the first thermal shrinkage ratio in the arbitrary direction from the first site and a second absolute value of the second thermal shrinkage ratio in the direction orthogonal to the arbitrary direction from the second site are 100 ppm or less.

3. The alkali-free glass substrate according to claim 2, wherein the first absolute value and the second absolute value are 70 ppm or less.

4. The alkali-free glass substrate according to claim 3, wherein the first absolute value and the second absolute value are 50 ppm or less.

5. The alkali-free glass substrate according to claim 1, which wherein the alkali-free glass substrate has a strain point of 630° C. or more.

6. The alkali-free glass substrate according to claim 5, wherein the strain point is 680° C. or more.

7. The alkali-free glass substrate according to claim 6, wherein the strain point is 700° C. or more.

8. The alkali-free glass substrate according to claim 1, wherein the alkali-free glass substrate has a substrate size of (1,450 mm×1,450 mm) or more.

9. The alkali-free glass substrate according to claim 8, wherein the substrate size is (3,000 mm×2,800 mm) or more.

10. The alkali-free glass substrate according to claim 1, wherein the alkali-free glass substrate has a thickness of 0.5 mm or less.

11. The alkali-free glass substrate according to claim 1, further comprising an alkali-free glass comprising, in terms of mass % on the basis of oxides, $SiO_2$: from 54 to 68%, $Al_2O_3$: from 10 to 23%, $B_2O_3$: from 0 to 12%, MgO: from 0 to 12%, CaO: from 0 to 15%, SrO: from 0 to 16%, and BaO: from 0 to 15%, provided that MgO+CaO+SrO+BaO: from 8 to 26%.

12. The alkali-free glass substrate according to claim 11, wherein the content of $B_2O_3$ is 5% or less in terms of mass % on the basis of oxides.

13. The alkali-free glass substrate according to claim 1, wherein the alkali-free glass substrate has a thickness deviation of 20 μm or less.

* * * * *

UNITED STATES PATENT AND TRADEMARK OFFICE
CERTIFICATE OF CORRECTION

PATENT NO. : 10,822,264 B2
APPLICATION NO. : 15/458519
DATED : November 3, 2020
INVENTOR(S) : Tetsushi Takiguchi et al.

Page 1 of 1

It is certified that error appears in the above-identified patent and that said Letters Patent is hereby corrected as shown below:

In the Claims

Claim 5, Column 17, Line 17:
Please delete:
"which wherein the alkali-free glass substrate has a strain"
Please replace with:
wherein the alkali-free glass substrate has a strain Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*